United States Patent [19]

Hawk

[11] 4,088,341
[45] May 9, 1978

[54] VEHICLE COUPLING SYSTEM
[75] Inventor: Dale Wyatt Hawk, Springfield, Ill.
[73] Assignee: Fiat-Allis Construction Machinery, Inc., Deerfield, Ill.
[21] Appl. No.: 644,464
[22] Filed: Dec. 29, 1975
[51] Int. Cl.² .............................................. B60D 3/00
[52] U.S. Cl. ............................... 280/481; 293/DIG. 1
[58] Field of Search ................... 280/481, 477, 479 R, 280/479 A, 489; 293/DIG. 1; 172/272, 275, 292

[56]   References Cited
U.S. PATENT DOCUMENTS

| 3,606,388 | 9/1971 | Campbell | 280/481 |
| 3,977,699 | 8/1976 | Wagatsuma | 280/477 |
| 4,018,452 | 4/1977 | Wagatsuma et al. | 280/481 |

FOREIGN PATENT DOCUMENTS 510,392   6/1976   U.S.S.R. .............................. 280/481

Primary Examiner—Robert R. Song
Assistant Examiner—John A. Pekar
Attorney, Agent, or Firm—August E. Roehrig, Jr.; Robert A. Brown; Harvey W. Rockwell

[57]   ABSTRACT

A selectively actuable push-pull vehicle coupling to be utilized in assisting loading of a vehicle by pushing or pulling the vehicle being loaded. A push plate and tow bar are operatively connected through a common shock absorber which is utilized to cushion vehicle impact during both pushing and pulling operations.

10 Claims, 6 Drawing Figures

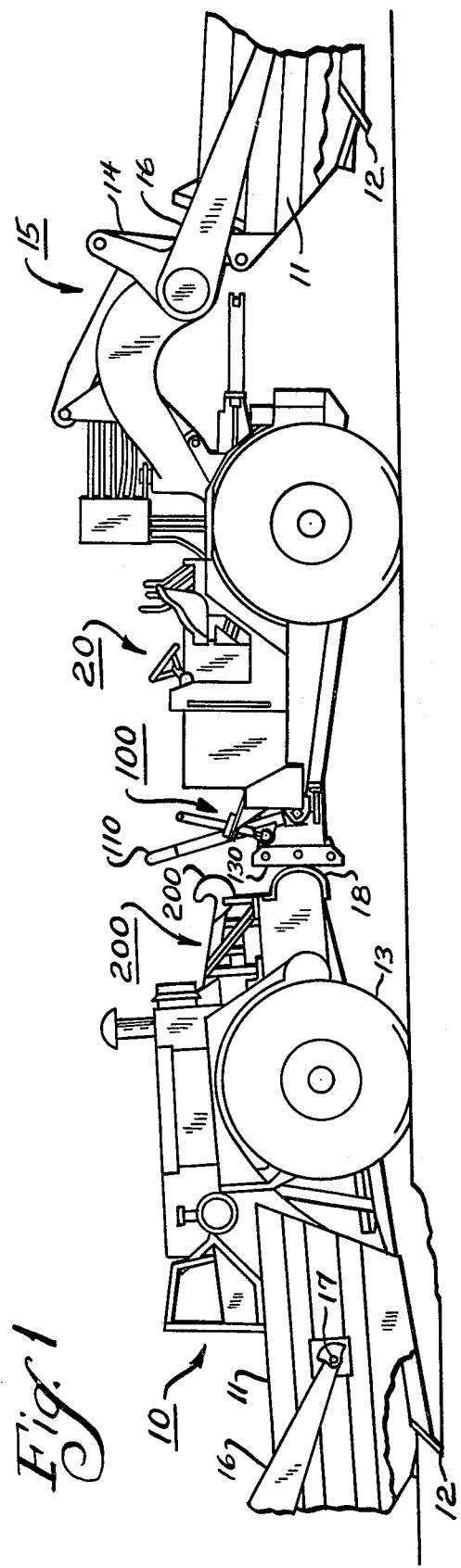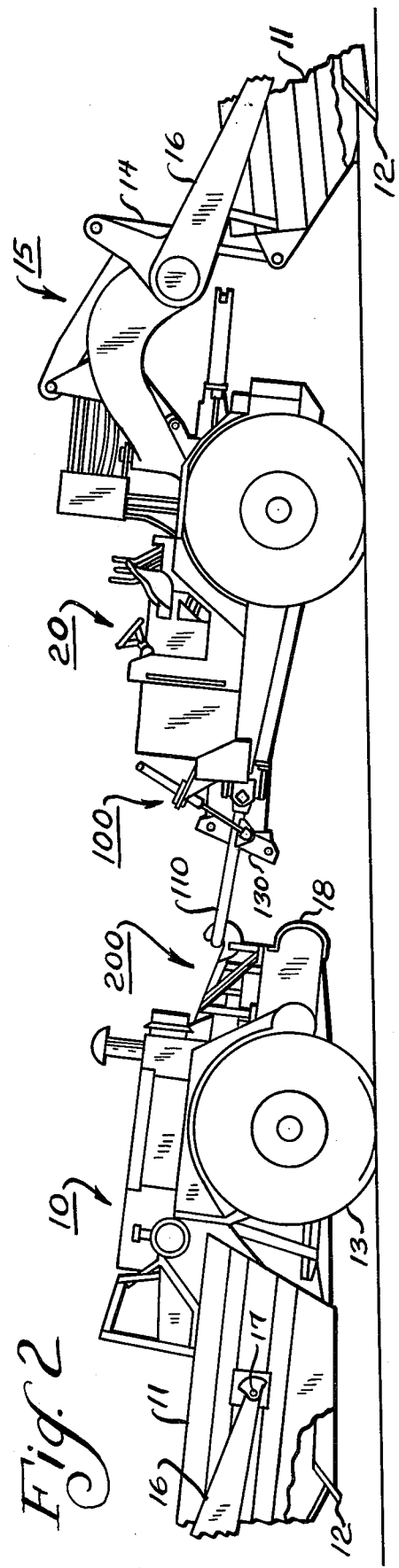

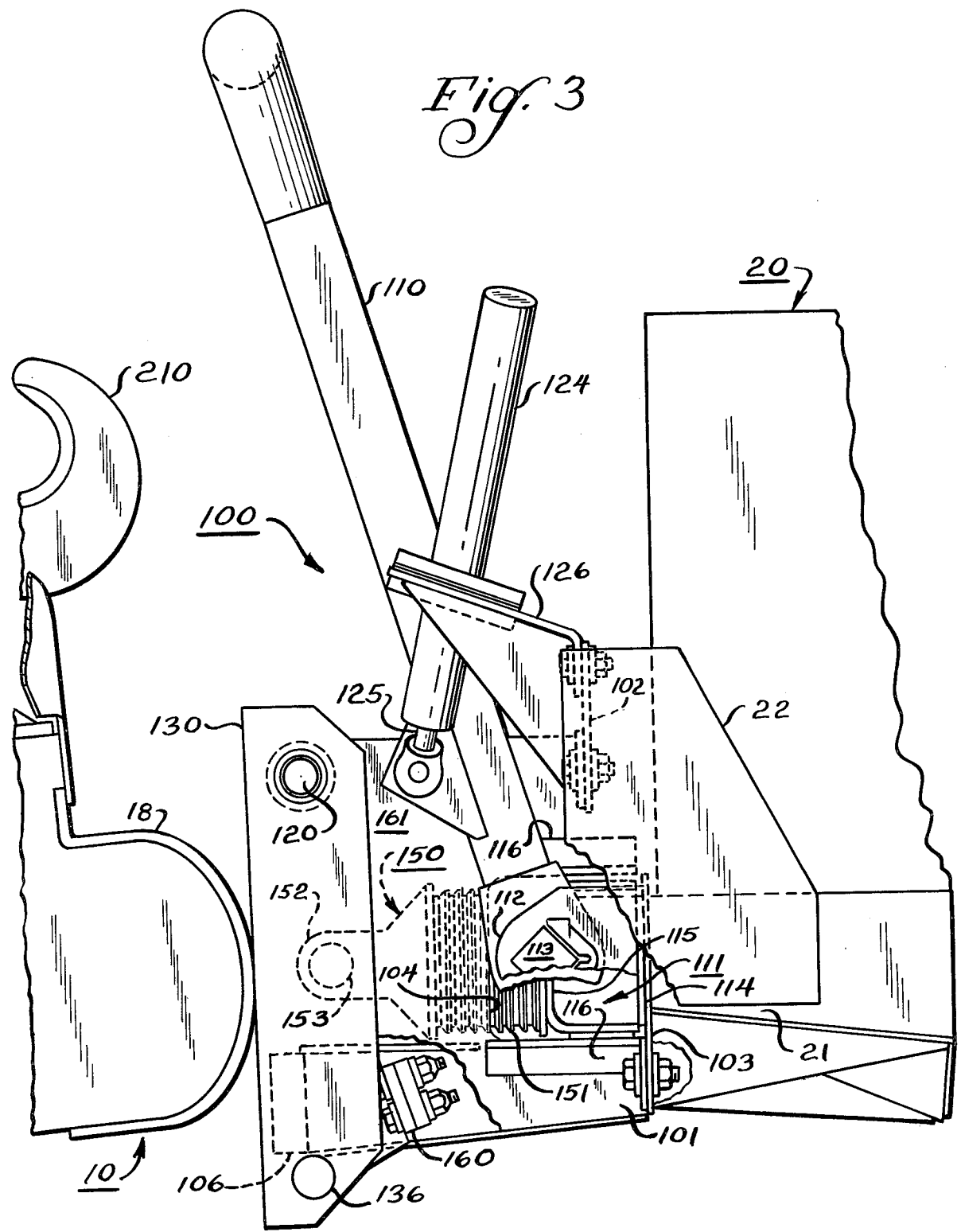

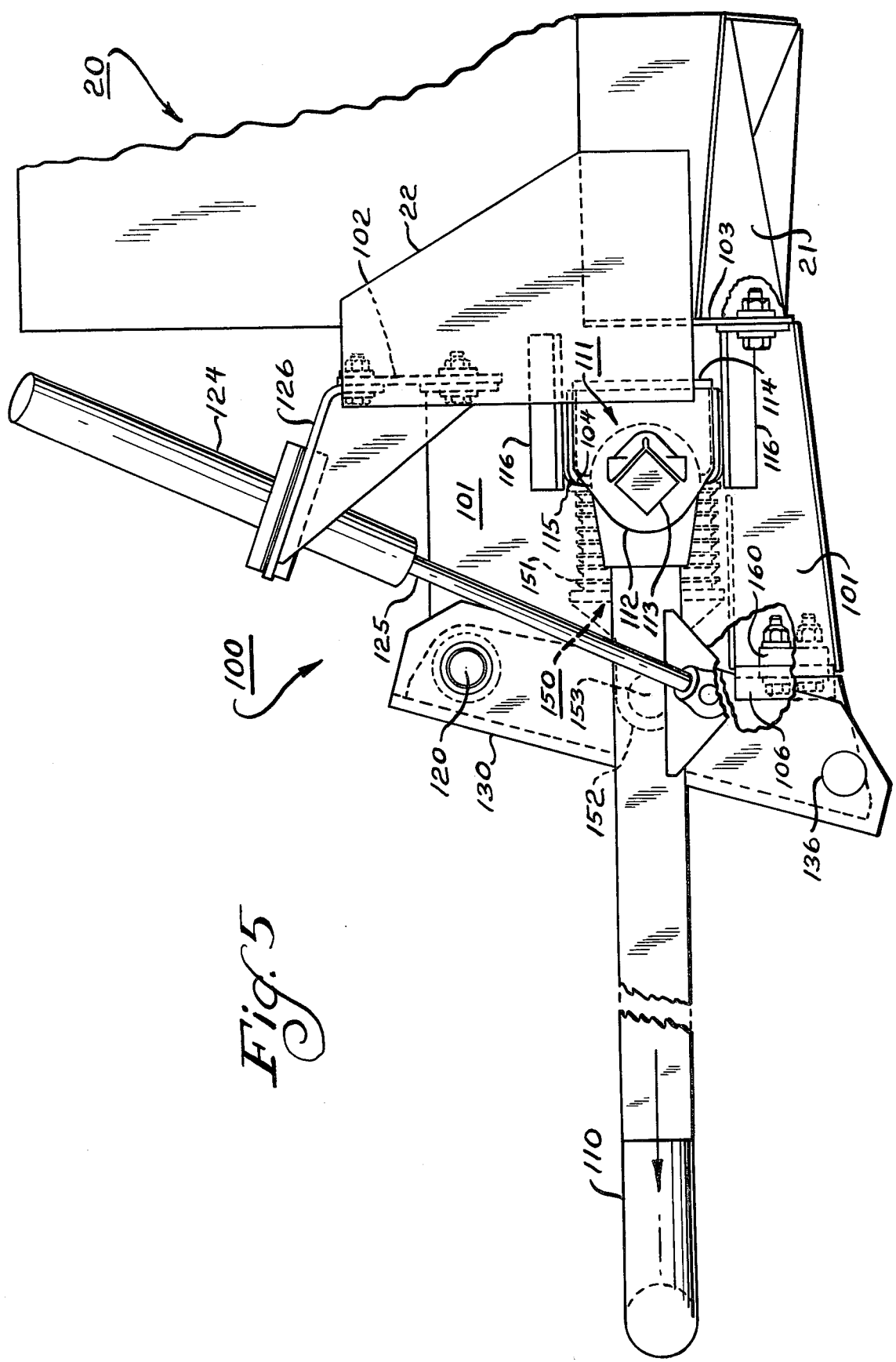

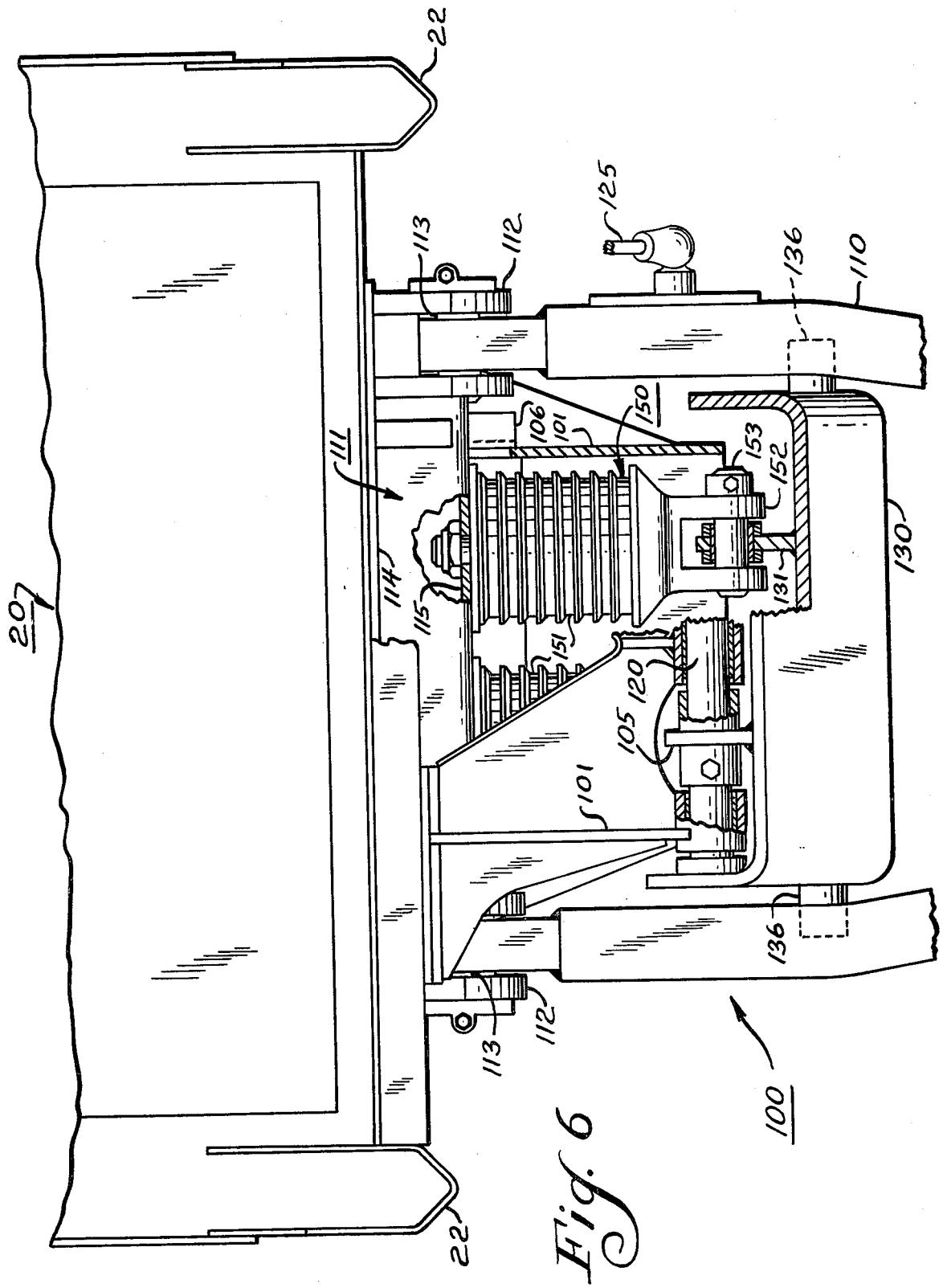

VEHICLE COUPLING SYSTEM

BACKGROUND OF THE INVENTION

This invention relates in general to a hitching system for coupling vehicles and, in particular, to a hitching system which may be selectively utilized to push or pull a vehicle.

More specifically, this invention relates to a hitching system particularly adapted for use with tandem loading earth moving vehicles and adapted to cushion the impact incurred upon pushing or pulling the loading vehicle.

During the excavating of material, such as encountered in land leveling and various types of construction wherein earth moving vehicles are utilized to cut earth from a borrow site and move it to a fill site, scraper type vehicles which include a scoop or bucket, known as a bowl, are employed to cut the earth from the borrow site and carry it to the fill site for unloading. Maximum power requirements are needed during the filling or cutting portion of the operation when the scraper bowl is cutting the earth from the borrow site and loading the fill into the bowls to be conveyed to the fill site. In difficult soil conditions, the vehicle tires frequently slip and spin when the bowl is engaged in the filling operation, thereby dissipating power. Therefore, it has been common practice to utilize an assist vehicle, either a crawler tractor or a second scraper, at the borrow site to push against the rear or to pull at the front of the loading vehicle to supplement the power required for the loading or filling operation.

During tandem loading operation when a crawler tractor is utilized, such operation is wasteful of both equipment and manpower due to the fact that the crawler equipment must be on standby except during that period of time in which it is utilized to assist the scraper in the loading or cutting operation. Therefore, to eliminate the necessity of having to maintain a crawler type tractor to assist in the loading operations, scraper vehicles are used in tandem relationship. A pair of scrapers are coupled together such that a following scraper pushes against the rear of the leading vehicle in order to supplement the tractive effort of the forward vehicle during the cutting or loading operation. During such operation, the assisting or following scraper normally has its bowl clear of the ground and is used only to supplement the tractive effort of the forward or loading vehicle. When the forward vehicle has been loaded, the bowl is raised clear of the ground and the forward vehicle assists in loading the following vehicle in a similar operation.

To avoid requiring that the forward or loaded vehicle reverse position to push against what heretofore was the following vehicle, various hitches or couplings have been designed for both pushing and pulling operations. Upon the loading of the forward vehicle with the assistance of the following pushing vehicle, a hitch is utilized to engage a suitable hook on the rear portion of the forward vehicle to pull the following vehicle during loading. While various hitch assemblies which alternatively function as a push-type hitch and a pull-type hitch have been utilized, such devices have not proven effective over uneven terrain when one of the coupled vehicles may be at a substantially different elevation or at an angle relative to the other resulting in frequent disconnection. In addition, impact between the vehicles upon engagement or during tandem loading frequently causes damage to the vehicles and, therefore, in order to minimize such damage the engagement of the vehicles is frequently extremely time consuming.

SUMMARY OF THE INVENTION

It is, therefore, an object of this invention to improve push-pull vehicle hitches.

It is another object of this invention to improve push-pull vehicle hitches for relatively fast engagement of the vehicles while damping the impact of one vehicle with the other.

A further object of this invention is to absorb the initial shock and impact resulting from the engagement of the vehicles during both pushing and pulling of the vehicles to assist in the loading operations.

These and other objects are attained in accordance with the present invention wherein there is provided a selectively actuable push-pull vehicle coupling to be utilized in assisting loading of a vehicle by pushing or pulling the vehicle being loaded. A push plate and tow bar are operatively connected through a common shock absorber which is utilized to cushion vehicle impact during both pushing and pulling operations.

DESCRIPTION OF THE DRAWINGS

Further objects of the invention together with additional features contributing thereto and advantages accruing therefrom will be apparent from the following description of one embodiment of the invention when read in conjunction with the accompanying drawings wherein:

FIG. 1 is a side elevational view of two scraper vehicles utilizing the invention of this application in a pushing mode whereby the following scraper is assisting in loading the leading scraper by pushing;

FIG. 2 is a side elevational view of two scraper vehicles utilizing the present invention in a pulling mode whereby the lead scraper is assisting the loading of the following scraper by pulling;

FIG. 3 is a side profile view of the vehicle coupling in the push mode with portions broken away to better illustrate the components thereof;

FIG. 5 is a side profile view of the vehicle scraper vehicles utilizing the present invention in a pulling mode whereby the lead scraper is assisting the loading of the following scraper by pulling;

FIG. 6 is a top horizontal profile view of the vehicle coupling in the pull mode with portions broken away to better illustrate the components thereof;

DESCRIPTION OF A PREFERRED EMBODIMENT

Figure 4:
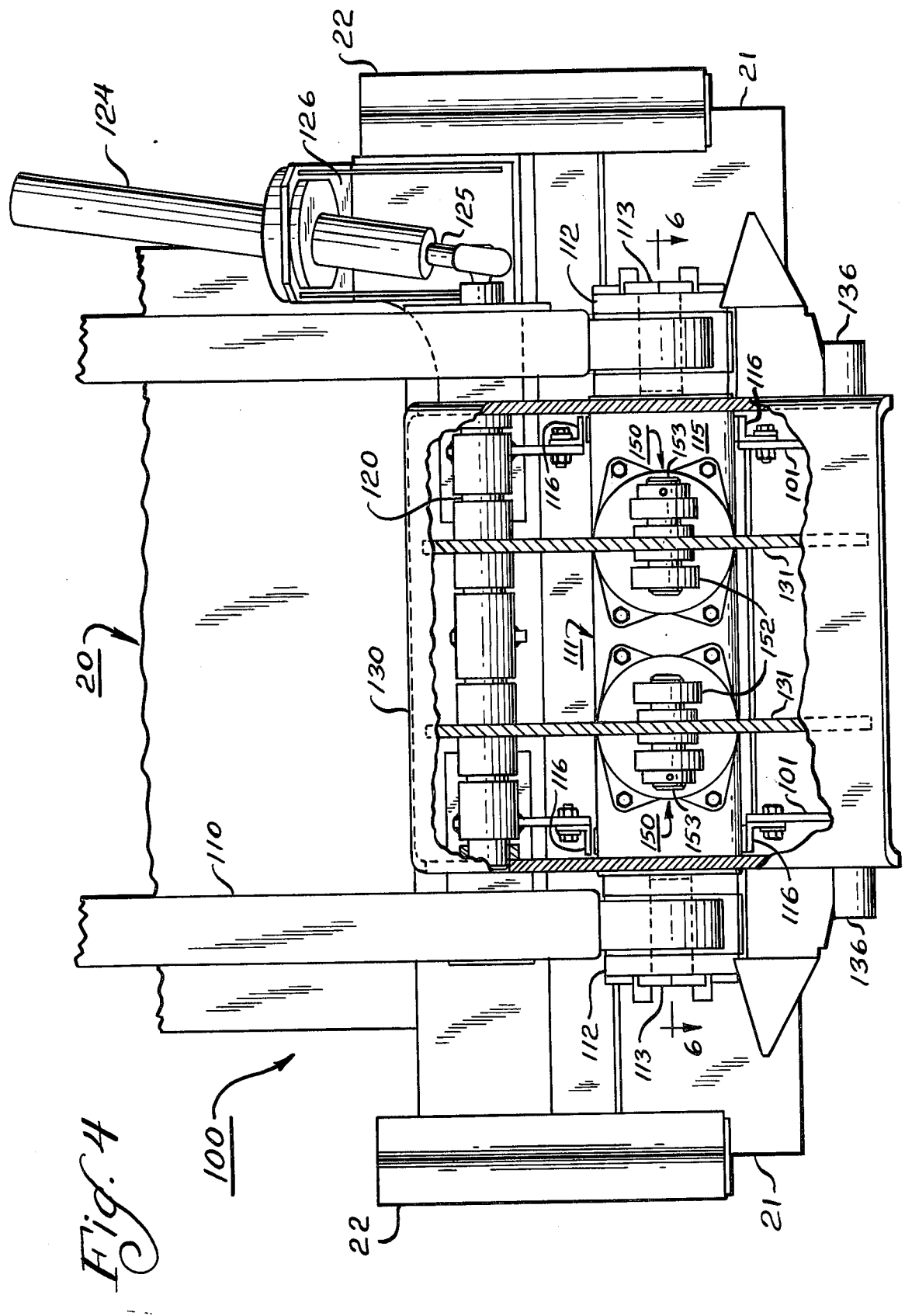
FIG. 4 is a frontal horizontal profile of the vehicle coupling in the push mode with portions broken away to better illustrate the components.

Referring now to FIGS. 1 and 2, there is shown an embodiment of the subject invention being utilized to couple two earth-moving vehicles, referred to as scrapers, for tandem loading the vehicles. Although this invention may be used as a coupling device for various vehicles, for convenience of illustration the preferred embodiment is described with reference to its use in coupling scrapers.

Scrapers 10 and 20, portions of which are illustrated in FIGS. 1 and 2, include a scraper bowl 11 supported at its rear end by a pair of wheels 13 (one of which is shown), and at its front end by a draft frame 15 having a pair of rearwardly extending legs 16 pivotally connected to the vertical side walls of the scraper bowl by a transverse pivot axis 17. The scraper bowl 11 includes a cutting edge 12 at the front end of the bottom which excavates a predetermined amount of material as the scraper passes over the ground. The amount of material removed as the scraper passes through the cut or borrow site is controlled by raising or lowering the cutting edge 12 carried at the front end of the scraper bowl. This positioning is effected by a pair of hydraulic jacks 14 interconnecting the draft frame 15 at the front or leading portion of the scraper bowl. The jacks 14 are expanded or contracted to determine the depth of cut of the cutting edge 12 with the material being excavated passing into the scraper bowl as the scraper is moved forwardly.

In the usual sequence of tandem loading, a following scraper 20 is utilized to assist in push-loading the forward scraper 10 as shown in FIG. 1. The following scraper 20 is unloaded and has its cutting edge 12 raised in order to provide the maximum pushing force against a bumper 18 of the leading scraper 10 during the tandem push-loading operation. The pushing force is applied through a push plate 130 of a push-pull coupling or hitch assembly 100 carried on the front end of each scraper. After the lead scraper 10 has been filled, a tow bar or bail 110 is lowered to engage a hook 210 of a hook assembly or coupling 200 carried at the rear end of each scraper so that the following scraper 20 may begin tandem pull-loading operation.

As shown in FIG. 2, when the bail 110 and hook 210 are engaged the operator of the previously loaded forward scraper 10 raises the cutting edge 12 of the forward scraper bowl so that maximum pulling power can be exerted to tandem pull-load the following scraper 20. Tanden loading performed in this sequence allows continuous operation since during push-loading the push-plate 130 of the following scraper 20 is contacting the bumper 18 of the forward or lead scraper 10. Upon completion of push-loading, the scrapers are in a position to engage their respective hook 210 and bail 110 so that as loading of the forward scraper 10 is completed the following scraper 20 can immediately begin its loading operation.

The push-pull coupling or hitch 100 which allows tandem loading of the scrapers is supported from each scraper frame 21 by a coupling frame 101 comprising spaced parallel plates which extend outwardly from and are secured to the scraper frame members, as best shown in FIGS. 3, 4, 5, and 6. The upper portion of the coupling frame 101 is secured to a support bar 102 extending transversely between the scraper frame members 21 by means of a pair of gusset plates 22 appropriately secured to the scraper frame members 21. The lower portion of the coupling frame 101 is secured to a support bar 103 extending transversely between the scraper frame members 21.

The push plate 130, used in the tandem push-loading operation, is pivotally supported from the coupling frame 101 by a pivot rod 120 secured thereto. A pair of spaced support arms 105 (one of which is shown in FIG. 6) are secured to an upper portion of the reverse side of the pushing face, with each support arm 105 being pivotally supported about the pivot rod 120.

The bail 110, used in tandem pull-loading operation, is formed in a generally U-shaped configuration. The open ends of the U are each pivotally connected to a cushion beam 111 which has a clevis 112 at each end through which a pivot pin 113 passes to connect the bail 110 with the cushion beam. The cushion beam 11 comprises a box channel having a bearing plate 114 on the rearward side and a portion of a shock or impact absorber assembly 150 secured to a forward side 115. A pair of guides 116 are secured to the outer portion of both plates of the coupling frame 101, above and below the cushion beam 111, to guide the movement thereof in a linear motion during impact between vehicles. The movement of the cushion beam is limited rearward by engagement of the bearing plate 114 with the scraper support bar 103 and forwardly by engagement of the forward side 115 with a stop portion 104 of the coupling frame 101.

When the push plate 130 or the bail 110 are engaged for tandem loading, the initial impact of the coupling creates substantial loading forces on the mechanical components of the push/pull hitch 100. This impact loading of the hitch assembly frequently results in damage to the hitch coupling. Therefore, in order to dissipate the forces encountered during impact between the two vehicles, the shock absorber or dampener 150 is used to absorb, or dissipate the impact load.

The shock absorber 150 includes a pair of linearly movable compression springs 151. The springs are secured at their rearward end to the forward side 115 of the cushion beam 111, and pivotally connected at their forward end to the back or rear portion of the push plate 130 by means of a clevis 152. A pivot pin 153 is inserted through the clevis 152 to join the forward end of the shock absorber 150 to a pivot arm 131 extending outwardly from and secured to the reverse side of the pushing face of push plate 130. The positioning or pivotal connection of the shock absorber 150 between the cushion beam 111 and the push plate 130 allows the shock absorber to be utilized in both push and pull tandem loading, as will be explained in detail hereinafter.

Pivotal movement of the push plate 130 about the pivot support 120 in a counter-clockwise direction (best shown in FIG. 3) occurs during tandem push-loading causing the shock absorber 150 to move linearly compressing the compression springs 151 dampening the impact occurring during the push-loading operation. Movement of the bail 110 outwardly as the vehicles engage in tandem loading operation compresses the shock absorber 150 during impact loading by linear movement of the cushion beam 111 outwardly against the force of the springs 151.

After the initial impact of the two tandem loading vehicles has been absorbed by the shock absorber 150, it is then desired to establish a solid contact between the two vehicles during the pushing or pulling operation. Referring again to the tandem push-loading operation (best shown in FIGS. 3 and 4), during such loading the coupling bail 110 is raised and held in its uppermost position, as shown, out from interference when the push plate 130 engages the rear bumper 18 of the forward scraper.

Raising of the bail 110 about the pivot connection 112–113 is effected by means of a hydraulic cylinder 124 carried by a bracket 126 secured to support bar 102. The hydraulic cylinder 114 has a retractable plunge rod 125 connected to the bail 110 such that extension and retraction of the plunge rod will cause the bail to pivot in an arc about the pivot connection. A pair of protruding cylindrical stop bars 136 extend outwardly from the side portions of the push plate 130 to limit the downward movement of the bail 110 before the cylinder plunge rod 125 is fully extended.

To effect solid contact between tandem push-loading scrapers after the initial impact has been dissipated, the push plate 130, upon engaging the rear bumper 18 of the forward vehicle, will be pivoted in a counter-clockwise direction (FIG. 3), compressing the shock absorber 150. This absorbing or dissipating of the initial impact dampens the movement of the push plate 130 in its counterclockwise pivot allowing the push plate to pivot until such time as the shock absorber is compressed and the push plate engages a stop block 106 secured to the coupling frame 101. In this manner the initial impact is absorbed, and solid contact between the vehicles is achieved. After the shock absorber 150 has dissipated the impact, by being sufficiently compressed to allow the push plate 130 to engage the stop block 106, solid contact is maintained between the vehicles through the coupling frame 101.

After the lead or forward scraper 10 has been loaded, the following scraper 20 lowers its bail 110 to engage the hook assembly 200 at the rear of the forward scraper. The forward scraper 10 raises its scraper bowl and cutting edge, and the following scraper 20 lowers its cutting edge 12 to begin tandem pull-loading operation. Engagement of the bail 110 with the hook assembly 200 causes the bail 110 to move outwardly (to the left in FIG. 5) from engagement with the vehicle-frame-supported lower support bar 103. Such movement compresses the shock absorber 150 between the forward side 115 of the cushion beam 111 and the reverse side of push plate 130. In this manner the initial shock or impact loading of the two vehicles is dissipated by compression of the shock absorber 150. However, again, upon dissipation of the impact load it is desired to have a solid connection between the two vehicles.

As the bail 110 is moved outwardly (FIG. 5) against the shock absorber 150, the shock absorber will rotate the push plate 130 clockwise until a predetermined limiting stop is reached. To effect a positive stop for the clockwise rotation of the push plate during the linear movement of the shock absorber 150, a stop 160 is secured to the inner portion of the push plate 130 and extends outwardly therefrom. Linear movement of the cushion beam 111 against the shock absorber 150 causes the stop portion 160 of the push plate to engage the stop block 106 carried by the coupling frame 101. The initial impact forces occurring during engagement of the bail 110 and the hook 210 are dissipated by compression of the shock absorber 150 until such time as the cushion beam 111 engages the stop portion 104 of the coupling frame 101 thereby forming a solid connection with the vehicle frame.

While the invention has been described to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best mode contemplated for carrying out this invention, but that the invention will include all embodiments falling within the scope of the appended claims.

What is claimed is:

1. A vehicle coupling selectively operable for effecting tandem pushing or pulling of another vehicle comprising pushing means carried by a vehicle in a position for applying a pushing force to another vehicle, said pushing means operatively connected to a compressible shock absorber and supported for pivotal movement relative thereto in a direction opposed to the pushing force applied to the other vehicle for compressing said shock absorber to dampen impact incurred when applying the pushing force, and tow bar means carried by the vehicle for receiving a pulling force applied from the other vehicle, said tow bar means operatively connected to said compressible shock absorber and selectively operable for movement into a position for engaging a portion of the other vehicle to receive the pulling force applied thereby to dampen impact incurred when receiving the pulling force by compressing said shock absorber.

2. An impact dissipating coupling system for tandem pushing or pulling of vehicles including yieldable pushing means to be carried on a vehicle in a position for effecting tandem pushing, said yieldable pushing means supported for pivotal movement upon tandem pushing engagement with another vehicle, shock absorber means operable to dissipate impact effected by engagement with another vehicle, said yieldable pushing means and said shock absorber means operatively connected such that said pivotal movement will operate said shock absorber means to dissipate impact effected by pushing engagement with another vehicle, and yieldable bail means to be carried on the same vehicle carrying said yieldable pushing means for engagement by another vehicle to effect tandem pulling, said yieldable bail means supported for movement in the direction of the applied pulling force upon tandem pulling engagement with another vehicle and operatively connected to said shock absorber means such that said movement will operate said shock absorber means to dissipate impact effected by pulling engagement with another vehicle.

3. A selectively operable coupling for use on a vehicle to effect pushing or pulling of another vehicle comprising pushing means carried by a vehicle for applying a pushing force against another vehicle, said pushing means supported on the vehicle for pivotal movement in a direction opposed to the pushing force during application of the pushing force against the other vehicle, a compressible shock absorber for dissipating impact incurred by coupling the vehicles, said pushing means operatively connected to said compressible shock absorber to compress said shock absorber upon said pivotal movement for dissipating impact incurred by application of the pushing force against the other vehicle, and tow bar means carried by the vehicle carrying said pushing means for receiving a pulling force applied against the vehicle, said tow bar means operatively connected to said compressible shock absorber, said tow bar means supported from the vehicle for movement in the direction of the applied pulling force to compress said compressible shock absorber upon said movement for dissipating impact incurred by application of the pulling force against the vehicle.

4. An impact absorbing vehicle coupling for use in tandem pushing or pulling of vehicles comprising
pushing means pivotally supported on a vehicle in a position for limited pivotal movement in a direction opposite to the direction of a pushing force applied during tandem pushing of another vehicle,
tow bar means selectively positionable for engagement by another vehicle to receive a pulling force for tandem pulling and pivotally supported on the vehicle for limited linear movement in the direction of a pulling force applied during tandem pulling by another vehicle,
impact absorbing means operatively connected between said pushing means and said tow bar means compressible upon said movement thereof for dissipating impact incurred during tandem pushing and pulling, and
stop means engagable by said pushing means and said tow bar means for limiting the respective movements thereof upon compression of said impact absorbing means.

5. The apparatus of claim 4 wherein said impact absorbing means comprises a compression spring operatively connected at one end to said pushing means and at the other end to said tow bar means, and compressible upon the movement thereof to dissipate impact forces incurred during tandem pushing and pulling.

6. The apparatus of claim 4 wherein said stop means includes
coupling frame means connected to the vehicle and extending outwardly therefrom defining a closed peripheral surface for engagement by a stop member operatively connected to said tow bar means to limit movement thereof, and
a stop member carried by said pushing means positioned to engage said coupling frame means for limiting the pivotal movement of said pushing means.

7. The apparatus of claim 6 wherein said tow bar means includes
a bail pivotally supported by a pair of clevis carried by a linearly movable support means,
said support means extending through said coupling frame closed peripheral surface and positioned for engagement therewith upon engagement of said tow bar means by another vehicle to define the limits of the linear movement thereof.

8. The apparatus of claim 4 wherein said tow bar means comprises a bail pivotally carried by a support member which is movable in a linear direction upon impact between vehicles.

9. The apparatus of claim 8 wherein said tow bar means further includes bail actuating means coupled to said bail for effecting arcuate movement thereof into and out from a position for engagement by another vehicle.

10. The apparatus of claim 9 wherein said pushing means includes stop means for engaging said bail to limit the arcuate movement thereof.

* * * * *